(12) United States Patent
Rosano (10) Patent No.: US 10,937,032 B2
(45) Date of Patent: *Mar. 2, 2021

(54) SYSTEMS AND METHODS FOR UPDATING PAYMENT CARD EXPIRATION INFORMATION

(71) Applicant: MasterCard International Incorporated, New York, NY (US)

(72) Inventor: Sharon A. Rosano, New Canaan, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 378 days.

This patent is subject to a terminal disclaimer.

(21) Appl. No.: 15/719,204

(22) Filed: Sep. 28, 2017

(65) Prior Publication Data

US 2018/0018668 A1 Jan. 18, 2018

Related U.S. Application Data

(63) Continuation of application No. 13/788,300, filed on Mar. 7, 2013, now Pat. No. 9,785,946.

(51) Int. Cl.
*G06Q 20/40* (2012.01)
(52) U.S. Cl.
CPC .................. *G06Q 20/409* (2013.01)
(58) Field of Classification Search
CPC ........ G06Q 10/00; G06Q 20/00; G06Q 30/00; G06Q 40/00
USPC ....................................... 705/3–44
See application file for complete search history.

(56) References Cited

U.S. PATENT DOCUMENTS

| 6,422,462 | B1 | 7/2002 | Cohen |
| 7,747,523 | B2 | 6/2010 | Cohen |
| 7,806,323 | B2 | 10/2010 | Fomitchev |
| 7,904,389 | B2 | 3/2011 | Digioacchino |
| 7,917,435 | B2 | 3/2011 | Hall et al. |
| 7,925,587 | B2 * | 4/2011 | DiGioacchino ........ G06Q 20/10 705/44 |
| 7,966,257 | B2 | 6/2011 | Digioacchino |

(Continued)

OTHER PUBLICATIONS

Ernie Schell, "Taking Credit", Target Marketing, 26, 12; Proquest Central, p. 39, December (Year: 2003).*

*Primary Examiner* — Frantzy Poinvil
(74) *Attorney, Agent, or Firm* — Armstrong Teasdale LLP (57) ABSTRACT

A computer-implemented method for updating merchant information regarding card-not-present recurring payment (CNP/RP) transactions is provided, wherein the method involves a recurring transaction initiated by a cardholder using payment card information stored by a merchant. The method includes querying a database coupled to a payment network to identify a candidate payment card having stale payment card data. The stale payment card data includes at least an existing expiration date that is within a predetermined period of time of a selected calendar date. The method also includes querying the database to identify at least one recent transaction involving the candidate payment card. The recent transaction includes payment card data having an updated expiration date. The method further includes notifying the merchant that the existing expiration date has been replaced with the updated expiration date.

20 Claims, 6 Drawing Sheets

(56) References Cited

U.S. PATENT DOCUMENTS

| | | | |
|---|---|---|---|
| 8,036,963 B2 | 10/2011 | Carroll et al. | |
| 8,109,436 B1* | 2/2012 | Hopkins, III | G06Q 20/383 235/380 |
| 8,452,683 B2 | 5/2013 | Bayne | |
| 8,595,490 B2* | 11/2013 | von Mueller | G06Q 20/401 713/168 |
| 8,805,736 B2* | 8/2014 | Melik-Aslanian | G06Q 40/00 705/38 |
| 2002/0004770 A1* | 1/2002 | Phillips | G06Q 20/102 705/34 |
| 2003/0191711 A1* | 10/2003 | Jamison | G06Q 20/04 705/40 |
| 2005/0055296 A1 | 3/2005 | Hattersley et al. | |
| 2007/0136211 A1* | 6/2007 | Brown | G07F 7/12 705/75 |
| 2009/0171839 A1 | 7/2009 | Rosano et al. | |
| 2010/0174644 A1 | 7/2010 | Rosano et al. | |
| 2010/0280948 A1 | 11/2010 | Cohen | |
| 2011/0153500 A1* | 6/2011 | DiGioacchino | G06Q 20/407 705/44 |
| 2011/0251955 A1* | 10/2011 | Lam | G06Q 20/105 705/41 |
| 2012/0036052 A1* | 2/2012 | Carroll | G06Q 20/102 705/30 |
| 2012/0284182 A1 | 11/2012 | Beckers | |
| 2012/0296824 A1 | 11/2012 | Rosano | |
| 2013/0030972 A1 | 1/2013 | Digioacchino | |
| 2014/0143145 A1* | 5/2014 | Kortina | G06Q 20/385 705/44 |
| 2015/0310439 A1* | 10/2015 | Powell | G06Q 20/3821 705/44 |
| 2016/0155124 A1* | 6/2016 | Howe | G06Q 20/34 705/44 |
| 2016/0253670 A1* | 9/2016 | Kim | G06Q 20/3227 705/72 |

\* cited by examiner

SYSTEMS AND METHODS FOR UPDATING PAYMENT CARD EXPIRATION INFORMATION

CROSS REFERENCE TO RELATED APPLICATIONS

This application is a continuation of U.S. patent application Ser. No. 13/788,300 filed Mar. 7, 2013, now U.S. Pat. No. 9,785,946 entitled "Systems and Methods For Updating Payment Card Expiration Information", the contents and disclosure of which are incorporated herein in their entirety.

BACKGROUND OF THE INVENTION

This invention relates generally to systems and methods for processing payment transaction and, more particularly, to systems and methods for automatically updating cardholder payment card expiration information stored by a merchant.

The payment card industry includes payment transactions wherein the transaction is recurring and the payment card is not present for the transactions. These transactions are sometimes referred to as "card-not-present recurring payment" (CNP/RP) transactions. Specifically, CNP/RP transactions are payment transactions that use payment card information stored by a merchant and wherein the payment card is not physically present for the actual transaction. For example, a health club member may wish to avoid mailing a monthly check for club membership dues. The member may instead register a payment card, such as a credit card, a debit card, or a prepaid card, with the club, enabling the health club to automatically charge the payment card for the monthly dues on a particular day each month. In some such systems, the merchant stores an account number, an expiration date, and/or other information associated with the payment card and/or cardholder.

In the event that some or all of the merchant-stored payment card information changes, there is a risk that payment transactions will be denied due to the use of stale and incorrect information. In such a case, the merchant must contact the cardholder in order to update the merchant records, or the cardholder must contact the merchant to report a change in information.

At least some systems enable merchants to submit billing files to a processing center or payment card system in order for the files to be updated with up to date payment card information. The new information is submitted to the processing center by an issuing bank that holds the account associated with the payment card.

None of the known recurring payment systems are capable of updating a merchant upon indication that a cardholder has physically used a card with a new expiration date, known as a "card-present transaction." Accordingly, a system and method for updating of payment card information stored by a merchant is needed, wherein the updated payment card information is identified and sent to the merchant when a CNP/RP transaction is initiated, thereby reducing or avoiding denied transactions due to stale card data.

BRIEF DESCRIPTION OF THE INVENTION

In one aspect, a computer-implemented method for updating merchant information regarding card-not-present recurring payment (CNP/RP) transactions is provided, wherein the method involves a recurring transaction initiated by a cardholder using payment card information stored by a merchant. The method includes querying a database coupled to a payment network to identify a candidate payment card having stale payment card data. The stale payment card data includes at least an existing expiration date that is within a predetermined period of time of a selected calendar date. The method also includes querying the database to identify at least one recent transaction involving the candidate payment card. The recent transaction includes payment card data having an updated expiration date. The method further includes notifying the merchant that the existing expiration date has been replaced with the updated expiration date.

In another aspect, a network-based system for updating merchant information regarding card-not-present recurring payment (CNP/RP) transactions is provided, and involves a recurring transaction initiated by a cardholder using payment card information stored by a merchant. The system includes a merchant computer associated with the merchant. The merchant computer is coupled to a merchant database. The merchant database is for storing the payment card information for the payment card that is registered to be used in the CNP/RP transaction. The payment card information includes an existing expiration date. The system also includes a payment network comprising a first database for storing payment card information, a second database for storing transaction information including payment card information, and a payment network server configured to be coupled to the merchant computer and to the first database. The payment network server is configured to query the first database to identify a candidate payment card having stale payment card data. The stale payment card data includes at least an existing expiration date that is within a predetermined period of time of a selected calendar date. The payment network server is also configured to query the second database to identify at least one recent transaction involving the candidate payment card. The at least one recent transaction includes payment card data having an updated expiration date. The payment network server is further configured to notify the merchant that the existing expiration date has been replaced with the updated expiration date.

In yet another aspect, computer-readable storage media having computer-executable instructions embodied thereon is provided. When executed by at least one processor, the computer-executable instructions cause the processor to query a first database to identify a candidate payment card having stale payment card data. The stale payment card data includes at least an existing expiration date that is within a predetermined period of time of a selected calendar date. The computer-executable instructions also cause the processor to query a second database to identify at least one recent transaction involving the candidate payment card. The at least one recent transaction includes payment card data having an updated expiration date. The computer-executable instructions further cause the processor to notify a merchant associated with a card-not-present recurring payment (CNP/RP) transaction that the existing expiration date has been replaced with the updated expiration date.

BRIEF DESCRIPTION OF THE DRAWINGS

FIGS. 1-6 show example embodiments of the method and system described herein.

DETAILED DESCRIPTION OF THE INVENTION

Described in detail herein are example embodiments of systems and methods that facilitate updating payment card information stored by a merchant for use in recurring payment transactions in which a card is not presented to the merchant, also called "card-not-present recurring payment" (CNP/RP) transactions. The systems and methods facilitate, for example, transferring new payment card information electronically over a network to update payment card information stored by a merchant that is found to be stale due to a change in card status and/or the issuance of a new card to the cardholder by an issuing bank. A technical effect of the systems and methods described herein include at least one of (a) identifying a payment card associated with a CNP/RP transaction either nearing expiration or having recently expired; (b) determining whether a database coupled to the payment card network includes new or updated information for the payment card; (c) notifying a merchant associated with the CNP/RP transaction that the payment card information has become stale; and (d) if the database includes updated payment card information, transmitting the updated information to the merchant, wherein the merchant updates the stale payment card information.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transaction card can be used as a method of payment for performing a transaction. In addition, cardholder account behavior can include but is not limited to purchases, management activities (e.g. balance checking), bill payments, achievement of targets (meeting account balance goals, paying bills on time), and/or product registrations (e.g. mobile application downloads).

As used herein, the term "card-present transaction" refers to a transaction in which a cardholder's payment card is present at the time the transaction is initiated. For example, when a consumer purchases groceries at a supermarket by swiping a credit card, this transaction is a card-present transaction because the cardholder, i.e., the consumer, has their payment card, i.e., the credit card, present at the time of the transaction. As used herein, the term "card-not-present transaction" refers to a transaction in which a cardholder's payment card is not necessarily present at the time the transaction is initiated, but instead the cardholder's account is identified without use of the physical payment card. For example, a consumer/cardholder purchasing a product or service from a merchant's internet web site may enter their account information. The merchant then initiates a transaction for the product or service using the account information entered by the consumer, without the payment card in the presence of the merchant.

As used herein, the term "account-on-file transaction" refers to a transaction in which a cardholder's physical payment card is not utilized to identify the cardholder's account information, but rather the cardholder's account information is stored and recalled at the time of the transaction, and thereby attached to the transaction for processing through the payment network. For example, in a CNP/RP transaction, a merchant, such as a workout gym, may have a customer/cardholder's payment card account information on file, which it may use on a periodic basis to initiate a CNP/RP transaction. The merchant, in this example, may initiate this transaction without the presence of the cardholder's card, through use of the account information on file. In another example, in an e-Commerce transaction, a consumer/cardholder may frequent a merchant's internet web site. Merchants may store payment card information associated with their consumers in order to facilitate ease of future purchases. The consumer/cardholder, in this example, may initiate a transaction with the merchant and use the account information stored on file with the merchant. The merchant then, in this example, may initiate a transaction without the presence of the cardholder's card, and instead utilize the account information on file.

As used herein, the term "merchant information", in the context of "account-on-file" transactions, such as CNP/RP transactions, refers to cardholder payment card information stored by a merchant to facilitate future transactions with the merchant on behalf of the cardholder. Merchant information may include any information associated with the cardholder's payment card and the CNP/RP transactions, including at least an expiration date.

As used herein, an acquiring bank, or acquirer, is typically a bank at which a merchant has an account. In addition, an issuing bank, or issuer, is typically a bank at which a customer, or cardholder, holds an account, which may be debited or charged through the use of a pre-paid card, a debit card, or a credit card.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

Figure 1:
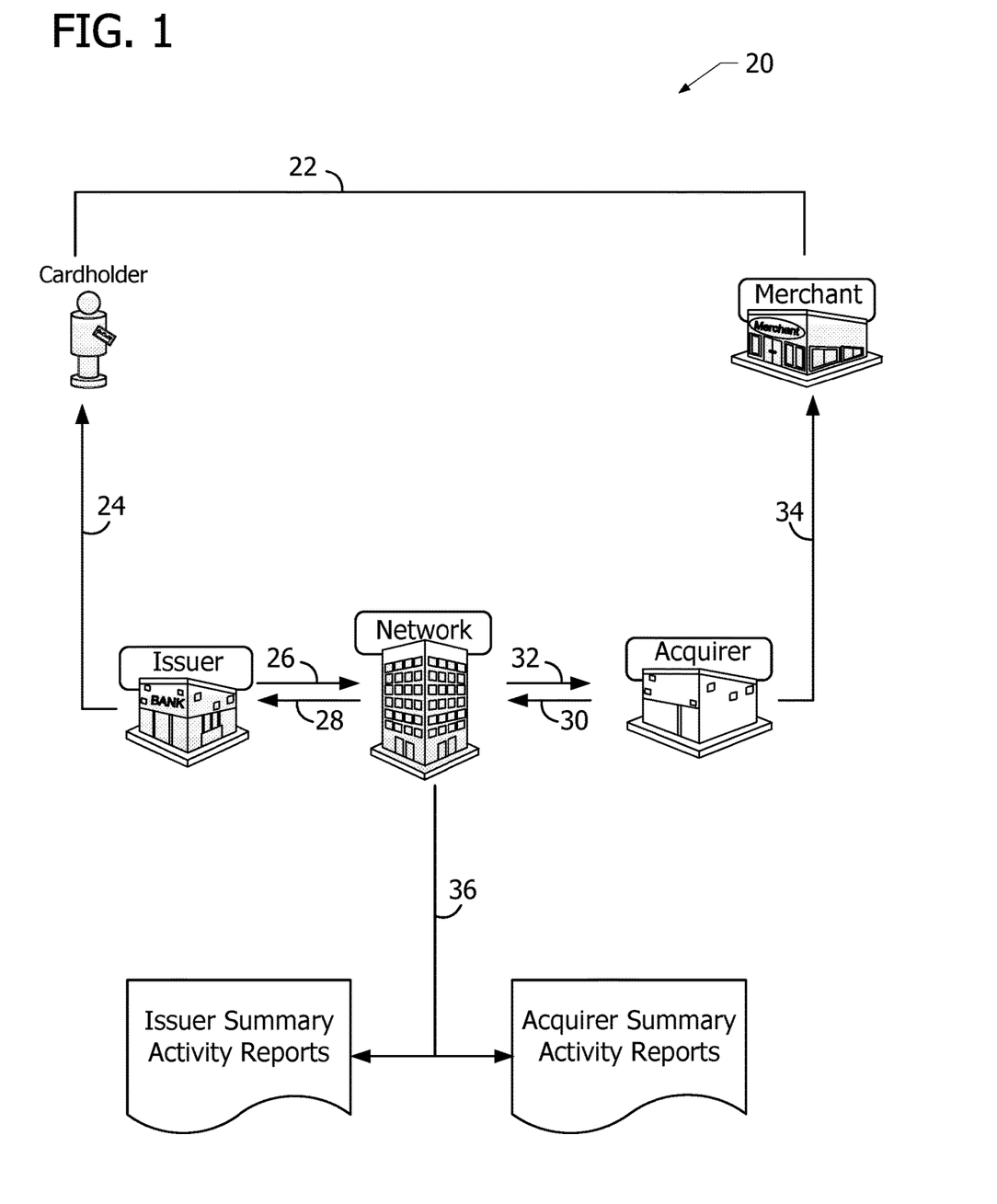
FIG. 1 is a simplified block diagram of a conventional billing update process.

FIG. 1 is a flowchart 20 illustrating a conventional billing update process. The process begins when a cardholder establishes 22 a recurring payment relationship with a merchant. The cardholder provides payment card information to the merchant, enabling the merchant to periodically charge the cardholder for a good or service by automatically charging the payment card on file. For example, the cardholder enters the payment card information into a web browser and submits the payment card information to the merchant, and the merchant stores the payment card information in a database and/or server. The payment card information used by the merchant may include the cardholder's name as it appears on the payment card, a billing address, an account number or card number of the payment card, and/or an expiration date of the payment card.

At some point after the cardholder establishes 22 the recurring payment relationship with the merchant, an issuing bank, or issuer, sends 24 the cardholder a replacement payment card or may change one or more piece of payment card information, such as the expiration date. This may be due to a loss of the payment card by the cardholder or a reissue of the payment card due to the passage of the payment card expiration date. In such a case, the new payment card information is not on file with the merchant. Thus, if the merchant attempts to charge the cardholder for a recurring payment using the payment card information stored by the merchant, the transaction is at risk of being denied due to the stale payment card information. To prevent a denial, the issuer may be enrolled in an update service that uses a MasterCard® payment network (MasterCard International Incorporated, Purchase, N.Y.). The MasterCard® payment network is a proprietary communications standard promulgated by MasterCard International Incorporated® for the exchange of financial transaction data between financial institutions that are members of MasterCard International Incorporated®. The issuer sends 26 updated payment card information to the payment network, which stores 28 the updated payment card information.

Acquiring banks, or acquirers, may also enroll in such an update service in order to obtain updated payment card information and to provide the updated payment card information to merchants. For example, an acquirer may periodically query 30 the payment network for updated payment card information for payment cards associated with their merchants' recurring payment transactions. The payment network determines 32 whether there exists updated payment card information and, if so, sends the updated information to the acquirer. The acquirer then sends 34 the updated payment card information to the merchant and the merchant updates the stale payment card information. Additionally, such a process includes a periodic report 36 of updated payment card information that is sent to acquirers and issuers.

Financial transaction cards, or payment cards, may refer to credit cards, debit cards, and prepaid cards. These cards may all be used as a method of payment for performing a transaction, such as a recurring transaction. As described herein, the term "financial transaction card" or "payment card" includes cards such as credit cards, debit cards, and prepaid cards, but also includes any other device that may hold payment account information for use in recurring transactions, such as mobile phones, personal digital assistants (PDAs), and key fobs.

Figure 2:
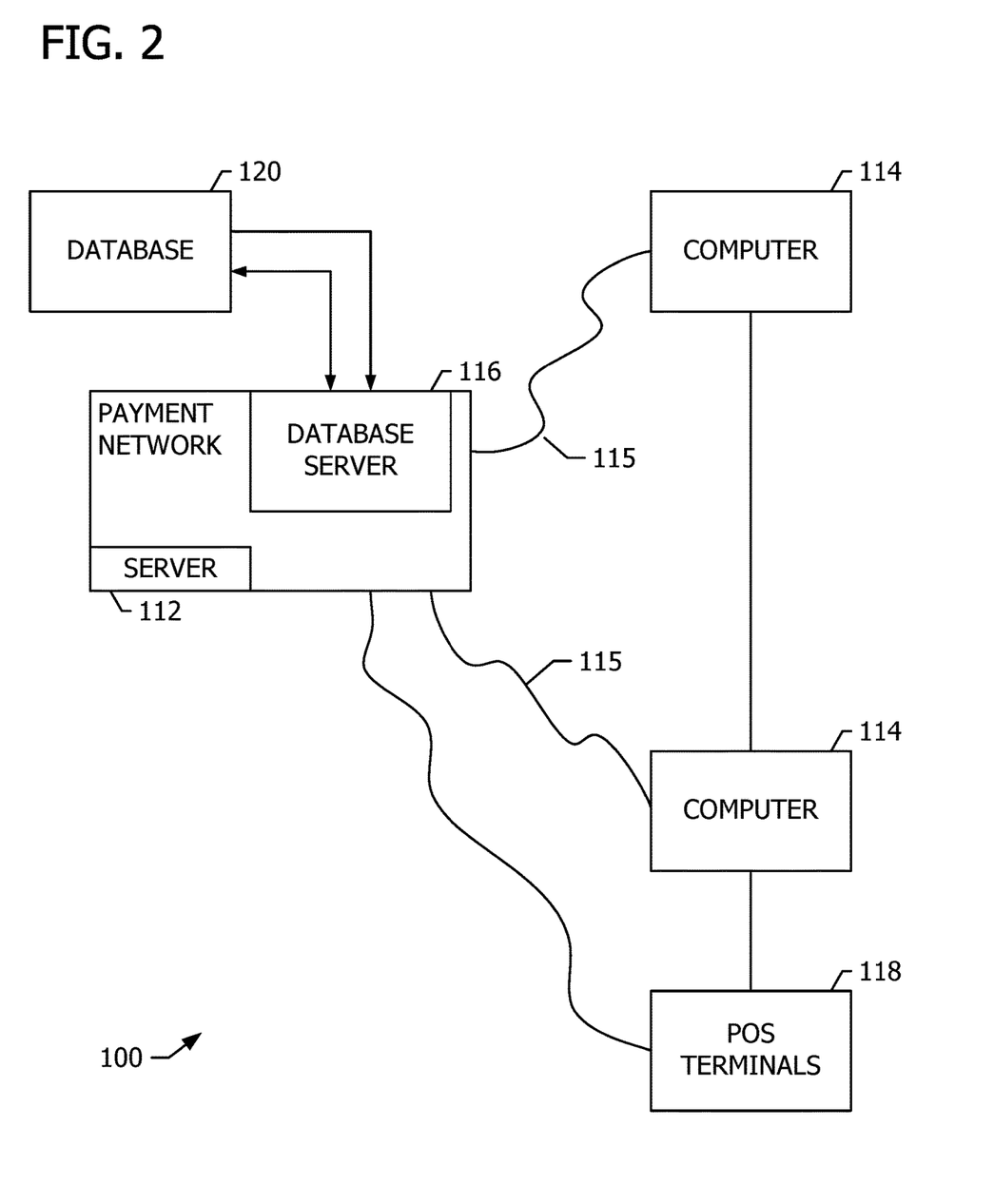
FIG. 2 is a simplified block diagram of an example embodiment of a server architecture of a system in accordance with one embodiment of the present invention.

FIG. 2 is a simplified block diagram of an example payment processing system 100 including a plurality of computer devices in accordance with one embodiment of the present invention. In one embodiment, system 100 is the financial transaction card payment system shown in FIG. 1, which may be utilized for processing recurring payments.

More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network 115, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

System 100 also includes point-of-sale (POS) terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a cardholder's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, and/or purchases made. Database 120 may also store account data including at least one of a cardholder name, a cardholder address, an account number, account expiration information, and other account identifier. Database 120 may also store data about a merchant, including a merchant identifier that identifies each merchant registered to use the network, and instructions for settling transactions including merchant bank account information. Database 120 may also store purchase data associated with items being purchased by a cardholder from a merchant, and authorization request data. As discussed below, payment card information that is updated periodically is stored within database 120, including account numbers, expiration dates, and account statuses, such as whether the account is closed. Data relating to the cardholder of a payment card may also be stored within database 120.

In the example embodiment, one of client systems 114 may be associated with acquirer bank while another one of client systems 114 may be associated with an issuer bank, a cardholder, and/or a merchant. POS terminal 118 may be associated with a participating merchant or may be a computer system and/or mobile system used by a cardholder making an on-line purchase or payment. Server system 112 may be associated with the payment network. In the example embodiment, server system 112 is associated with a payment network, and may be referred to as a payment computer system. Server system 112 may be used for processing transaction data. In addition, client systems 114 and/or POS terminal 118 may include a computer system associated with at least one of an online bank, a bill payment outsourcer, an acquirer bank, an acquirer processor, an issuer bank associated with a transaction card, an issuer processor, a remote payment system, and/or a biller.

Figure 3:
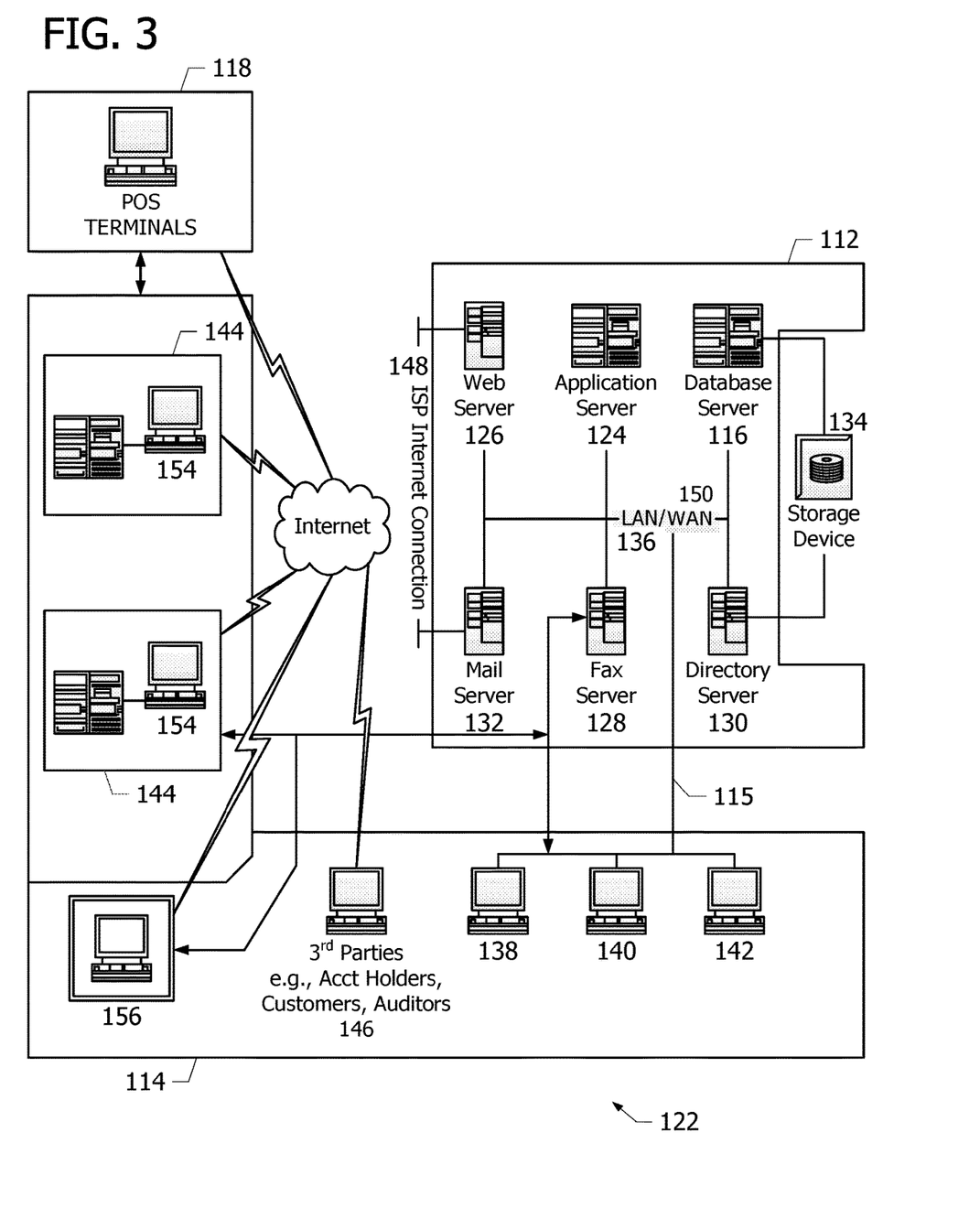
FIG. 3 is an expanded block diagram of an example embodiment of a server architecture of a system in accordance with one embodiment of the present invention.

FIG. 3 is an expanded block diagram of an example embodiment of a server architecture of a processing system 122 including other computer devices in accordance with one embodiment of the present invention. Components in system 122, identical to components of system 100 (shown in FIG. 2), are identified in FIG. 3 using the same reference numerals as used in FIG. 2. System 122 includes server system 112, client systems 114, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network connection 115. Alternatively, workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, cardholders, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
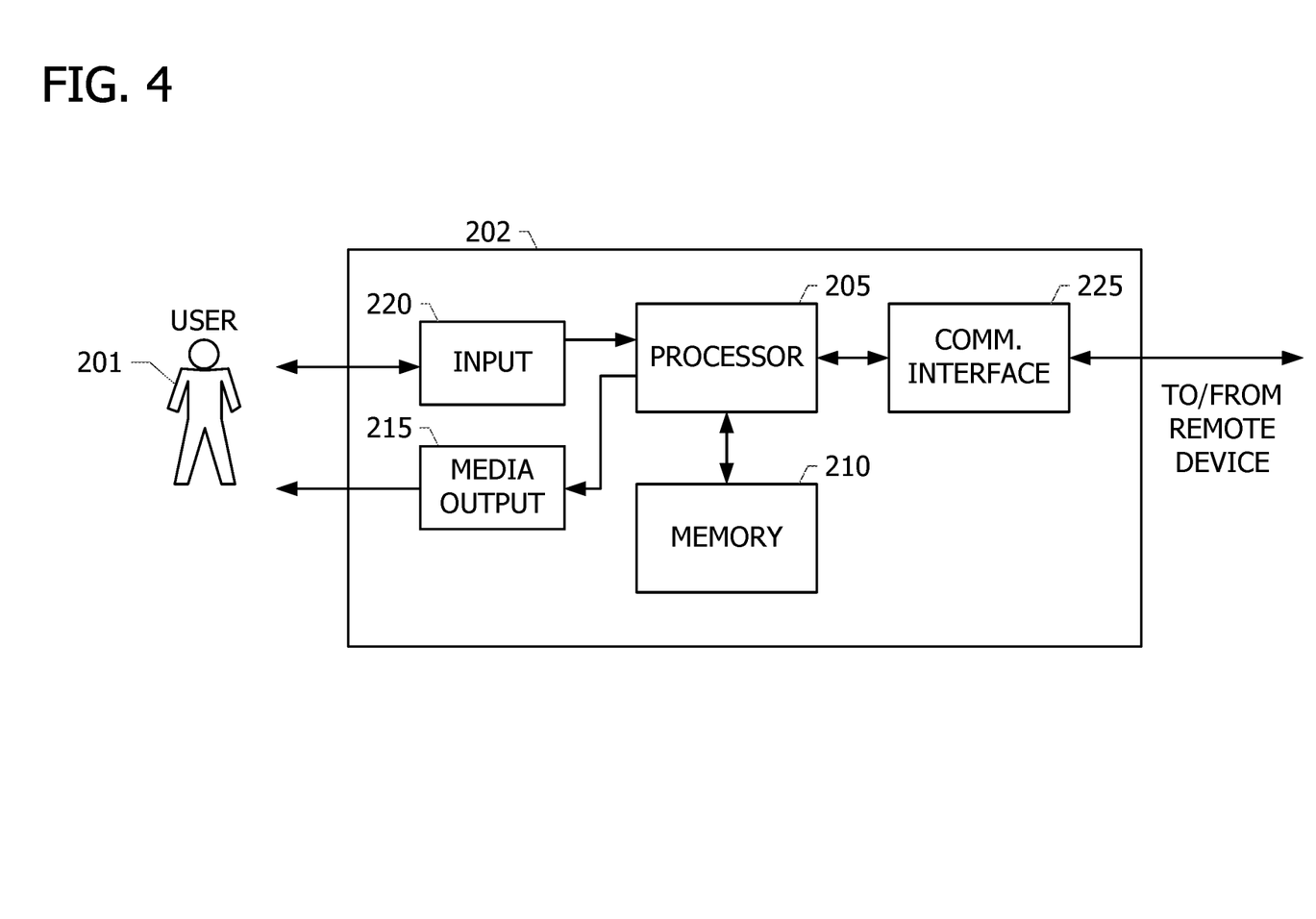
FIG. 4 illustrates an example configuration of a client system shown in FIGS. 2 and 3.

FIG. 4 illustrates an example configuration of a user system 202 operated by a user 201, such as a cardholder. User system 202 may include, but is not limited to, client systems 114, 138, 140, and 142, POS terminal 118, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
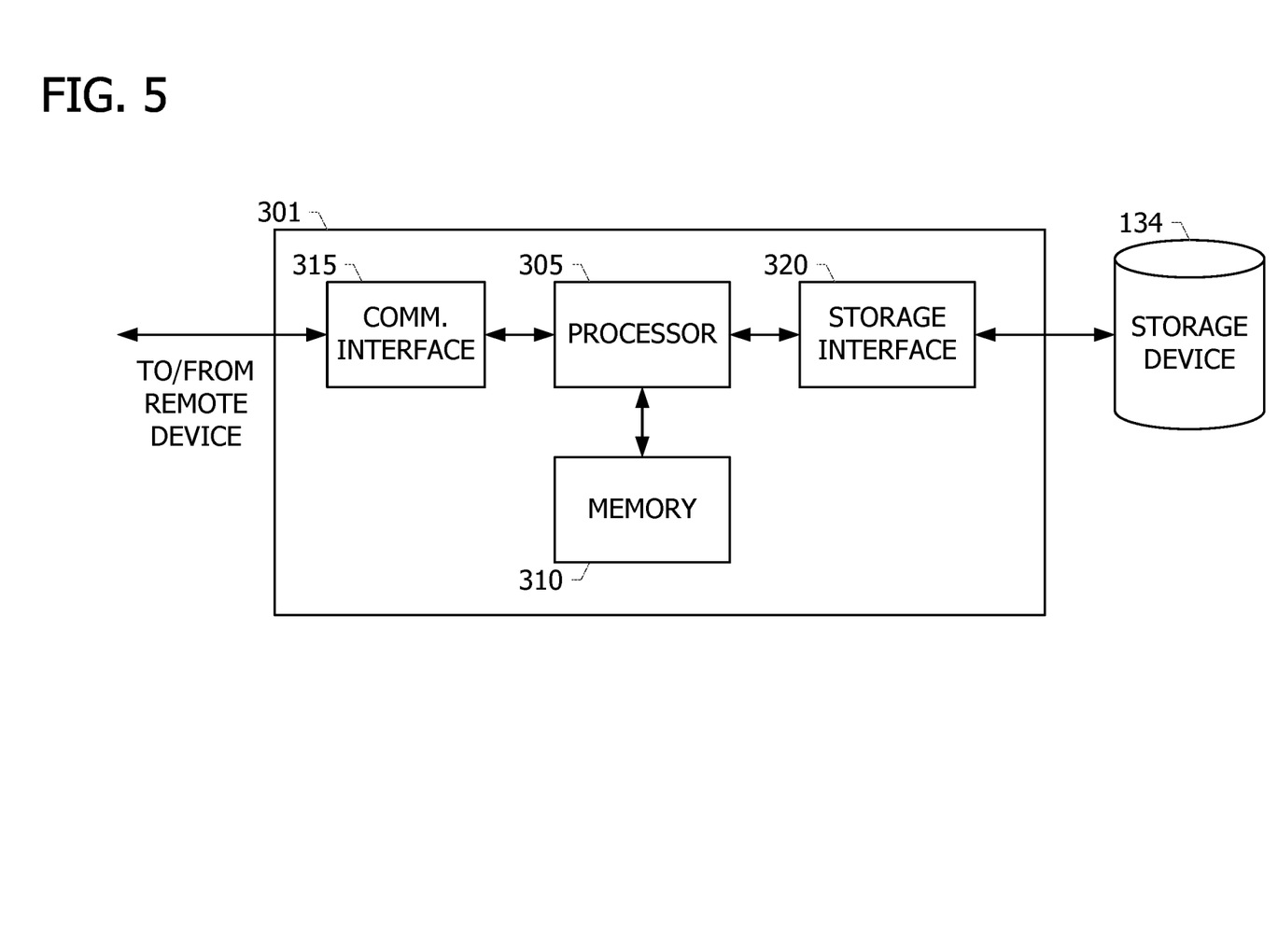
FIG. 5 illustrates an example configuration of a server system shown in FIGS. 2 and 3.

FIG. 5 illustrates an example configuration of a server system 301 such as server system 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX®, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from client system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
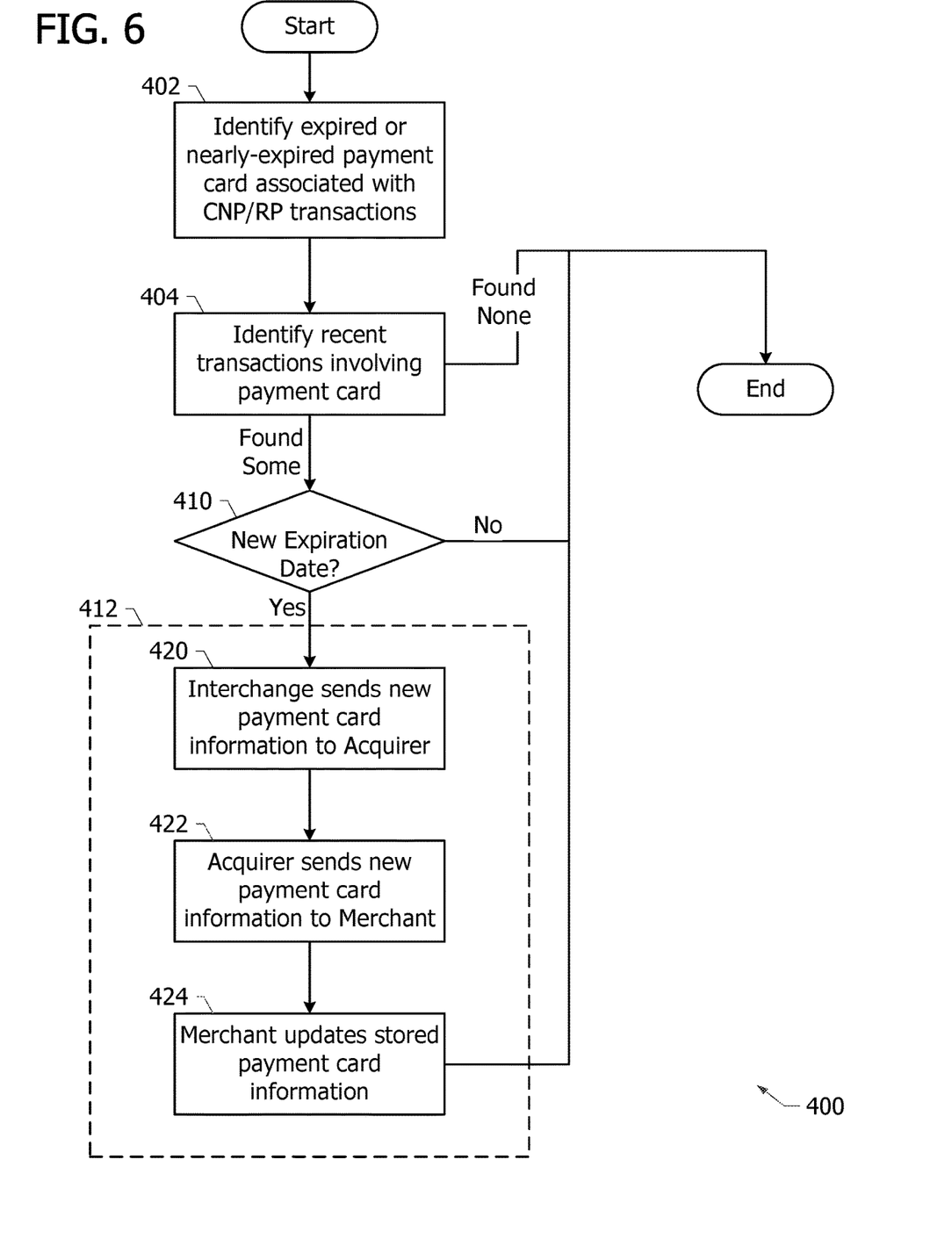
FIG. 6 is a simplified flowchart illustrating an example process utilized by system shown in FIG. 3 for automatically updating cardholder payment card expiration information stored by a merchant.

FIG. 6 is a simplified flowchart 400 illustrating an example process utilized by a system 100 (shown in FIG. 2) for automatically updating cardholder payment card expiration information stored by a merchant. System 100 is sometimes referred to as the recurring payment transaction system, which may be utilized for processing recurring payments using payment card information stored by a merchant. In the example embodiment, system 100 may be utilized by an issuer that issues a payment card, a cardholder who uses the payment card to tender payment for a recurring purchase from a merchant, a merchant that sells a product or service, an acquirer, or a payment network for processing the payment transaction. System 100 may also be utilized by the payment network to send updated payment card information to a merchant for updating stale payment card information stored by the merchant.

In the example embodiment, system 100 facilitates updating stale payment card information. A technical effect of the systems and methods described herein is achieved by storing, by a cardholder, payment card information at a merchant. For example, the cardholder may enter the payment card information using a web browser or the merchant may enter the payment card information into their bill payment system. The payment card information may include information such as: an account or card number; an expiration date for the payment card; and/or a cardholder name. The merchant then uses the stored payment card information for periodic, or recurring, transactions. At some point, however, the payment card will near expiration or expire, and the cardholder may be issued a card with a new expiration date. If the merchant attempts to use the stale payment card data, the CNP/RP transaction may be denied.

In the example embodiment, during processing of CNP/RP transactions, system 100 queries a database server 116 (shown in FIG. 2) and identifies 402 at least one payment card with an expiration date nearing expiration or having already expired. In some embodiments, the processing and identification 402 of CNP/RP transactions may occur during batch processing of transactions, and may occur nightly, or on other periodic periods. In other embodiments, the query and identification 402 may occur contemporaneously with a transaction submitted by, for example, a merchant or a cardholder, such as in an e-commerce card not present, account on file transaction. In such a situation, the account associated with the transaction may be analyzed prior to further processing of the transaction to identify 402 whether or not the transaction involves a payment card with an expiration date nearing expiration or having already expired. Further, in some embodiments, the query considers only payment cards known to be associated with CNP/RP transactions. Further, in some embodiments, the payment card may be identified 402 based at least in part on receiving updated payment card information from an issuer after the issuer has issued an updated card. In the example embodiment, database server 116 queries a database 120 having at least payment card information. Once identified 402, the "candidate" payment card will have an "old" expiration date, i.e., an expiration date nearing expiration or having recently expired. Such a card is referred to, herein, as being "stale." Further, as used herein, the term "candidate payment card" refers to a payment card that is under investigation regarding whether it has data stored by a merchant that may benefit from an update.

Also, in the example embodiment, system 100 is configured to identify 404 a recent transaction or transactions involving the payment card having an updated expiration date. System 100 searches database 120 for recent "card-present" transactions involving the payment card. Alternatively, system 100 may search database 120 for any recent transactions involving the payment card which may have updated expiration date information. Each recent transaction has associated payment card information, including a "current" expiration date. In the case of a payment card that is still active, the "current" expiration date of the recent transaction should match the "old" expiration date associated with the payment card. However, if the dates are different, a payment card update event may have occurred. System 100 compares 410 the current expiration date of the transaction to the "old" expiration date identified 402 above. If the current expiration date for the payment card is different from, and newer than, the old expiration date, this identifies a payment card reissue situation in which the cardholder has activated a reissued card, thereby potentially requiring an update to any merchants associated with CNP/RP transactions for this payment card. In the example embodiment, database server 116 queries a database 120 having at least payment card transaction information. In some embodiments, the database used for identifying 402 payment cards and the database used for identifying 404 recent transactions may be the same database 120. Alternatively, different databases 120 residing on the same or different servers 112 or database servers 116 may be used. Further, database server(s) 116 may belong to any participant in the payment network.

Further, in the example embodiment, after having identified a CNP/RP transaction merchant and a payment card for updating, system 100 notifies 412 the merchant that the "old" set of payment card information has become stale. In the example embodiment, notification involves sending 420, over the payment card network, new payment card information to the acquirer associated with the identified merchant. The acquirer then sends 422 new payment card information to merchant, who subsequently updates 424 the stored CNP/RP payment card information in their own database. In some embodiments, the original CNP/RP transaction may be enhanced by appending the new information to the transaction. The issuer may allow the CNP/RP transaction to proceed, or the issuer may reject the transaction. The merchant, in this embodiment, will receive the enhanced transaction and the new expiration date, and thereby updates the account-on-file information for that particular payment card with the new expiration date. Alternatively, the update information may be transmitted separately to the merchant.

For example, a cardholder establishes a CNP/RP transaction with their gym that includes a monthly transaction for their membership fee. The merchant gym stores the cardholder's original payment card information, and subsequently performs monthly transactions using the original payment card information. When the payment card nears expiration, the issuer of the payment card sends the cardholder a new payment card that includes an updated expiration date. The cardholder activates the new payment card, thereby automatically deactivating the original payment card. If the merchant gym processes the next monthly transaction for the cardholder using the original payment card information the merchant has stored, the transaction may fail. However, the cardholder may perform another card present transaction with the new payment card information. The systems and methods described herein recognize that the cardholder has initiated a transaction with an updated payment card, and recognize that the merchant gym may have stale information relative to that same payment card. If the updated expiration date stored by database 120 differs from the expiration date stored by the merchant gym, the merchant will update at least its stored expiration date to match the expiration date stored by database 120.

As used herein, the term "stale", as used with regard to a payment card, generally refers to the integrity of the data associated with the payment card. "Stale" payment card data may be data that is currently bad, or incorrect, expired, or otherwise insufficient to complete a payment card transaction. Additionally, "stale" payment card data may be data that is about to become bad, incorrect, expired, or otherwise insufficient. In the example embodiment, an expiration date associated with a payment card is "stale" when the expiration date has passed. Further, the expiration date may be considered "stale" prior to the expiration date. In common industry practice, a payment card may be reissued to a cardholder days, weeks, or months prior to the expiration date of the original payment card. Cardholders often activate the reissued payment card, a transaction that may deactivate the original payment card. Any CNP/RP transaction using the original payment card data after the cardholder has activated the reissued payment card may fail. In the example embodiment, payment cards are treated as "stale" any time after 60 days prior to their original expiration date. Alternatively, other stale dates, such as between 0 and 90 days prior to the original expiration date, may be used. Further, a stale date after the original expiration date may also be used, and still be within the scope of this invention.

Further, as used herein, a "stale date" is a date at which payment cards having an expiration date before such date are considered "stale". For example, if the system uses a period of 60 days (or 2 calendar months) as the stale period, a payment card with an original expiration date of Jul. 1, 2012 will be considered "stale" 60 days (or 2 calendar months) prior to the expiration date, or May 1, 2012. After this "stale date", May 1, 2012, the system will start considering this example payment card as a candidate for potentially requiring an update to a merchant having a CNP/RP transaction with this payment card.

In the example embodiment, identifying 402 a payment card and identifying 404 recent transaction information for the card containing updated expiration information each are performed by the payment card network. Alternatively, to the extent possible, any party that enables operation of system 100, such as, without limitation, an issuer or an acquirer, may perform the systems and methods described herein.

The systems and methods described herein enable automatically updating cardholder payment card expiration information stored by a merchant, prior to a failed CNP/RP transaction. The network identifies expiration date changes for payment cards associated with CNP/RP transactions, and pushes an unsolicited update to the merchant, which alleviates burden on the merchants to manually solicit updated card information from their customers. In addition, the issuing bank, the acquiring bank, and the merchant benefit from lower rates of transaction denials due to stale information stored by the merchant, and the cardholder receives the products or services they expect without interruption. This lowers the cost of operations for the issuing bank, acquiring bank, and/or merchant by alleviating the need to contact the cardholder, and also results in greater satisfaction for the cardholder in that the payment card information only needs to be entered at the initial setup of the recurring payment.

Although the systems and methods described herein are described in the context of real time payment card information updates, it is understood that the apparatus and methods are not limited to such systems and/or methods. Likewise, the system components illustrated are not limited to the specific embodiments herein, but rather, components of the system may be utilized independently and separately from other components described herein. Further, although the systems and methods described herein are described in the context of card-not-present recurring payment (CNP/RP) transactions, it is understood that the systems and methods are not limited to just CNP/RP transactions, but are applicable to other types of "account-on-file" transactions where a 3$^{rd}$ party, such as a merchant, has a cardholder's payment card information on file.

While the invention has been described in terms of various specific embodiments, those skilled in the art will recognize that the invention can be practiced with modification within the spirit and scope of the claims.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are paymentable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is determining a storage location, determining a stock count, receiving a request for a customer network unit, processing the request, generating and transmitting a request for deployment of the customer unit, and adjusting the stock count in the storage location. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer system for synchronizing distributed databases including a first database associated with a first merchant and a second database associated with an issuer party, said computer system comprising:
    a payment processing computing device in communication with at least one memory device for storing payment card information and transaction information, the payment processing computing device configured to:
        select, by querying a database in the at least one memory device for payment cards having expiration dates within a predetermined time period from expiration, a candidate payment card having stale payment card information including an existing expiration date and an account identifier;
        perform a lookup in at least one memory device using the account identifier;
        retrieve, based on the performed lookup, at least one payment transaction record from the at least one memory device corresponding to a recent card-present payment transaction performed by a cardholder at a second merchant using the candidate payment card;
        determine that the at least one retrieved payment transaction record includes updated expiration date data by comparing an expiration date associated with the at least one retrieved payment transaction record with the existing expiration date of the candidate payment card;
        generate an updated expiration date notification;
        automatically transmit the updated expiration date notification to a first merchant computer associated with the first merchant, the updated expiration date notification indicating that the existing expiration date has been replaced with the updated expiration date; and
        cause, by the transmission, the distributed databases to be synchronized by updating the first database and the second database.

2. A computer system in accordance with claim 1, wherein the existing expiration date of the candidate payment card is after a stale date, wherein the stale date is a predetermined number of days before the existing expiration date.

3. A computer system in accordance with claim 1, wherein the payment processing computing device is further configured to transmit the updated expiration date to the first merchant computer.

4. A computer system in accordance with claim 3, wherein the payment processing computing device is further configured to transmit the payment card information to the first merchant computer.

5. A computer system in accordance with claim 3, wherein the first merchant computer is further configured to update the payment card information in the first database to match the updated expiration date.

6. A computer system in accordance with claim 3, wherein the first merchant computer is further configured to update the existing expiration date in the first database with the updated expiration date.

7. A computer system in accordance with claim 1, wherein the candidate payment card is associated with a card-not-present recurring payment (CNP/RP) transaction.

8. A computer system in accordance with claim 7, wherein the payment processor computing device is further configured to notify an acquirer bank computing device associated with the first merchant that the existing expiration date has been replaced with the updated expiration date, and that the updated expiration date should be used for future transactions.

9. A payment processing computing device for synchronizing distributed databases including a first database associated with a first merchant and a second database associated with an issuer party, the payment processing computing device in communication with at least one memory device for storing payment card information and transaction information, the payment processing computing device configured to:
  select, by querying a database in the at least one memory device for payment cards having expiration dates within a predetermined time period from expiration, a candidate payment card having stale payment card information including an existing expiration date and an account identifier;
  perform a lookup in the at least one memory device using the account identifier;
  retrieve, based on the performed lookup, at least one payment transaction record from the at least one memory device corresponding to a recent card-present payment transaction performed by a cardholder at a second merchant using the candidate payment card;
  determine that the at least one retrieved payment transaction record includes updated expiration date data by comparing an expiration date associated with the at least one retrieved payment transaction record with the existing expiration date of the candidate payment card;
  generate an updated expiration date notification;
  automatically transmit the updated expiration date notification to a first merchant computer associated with a first merchant, the updated expiration date notification indicating that the existing expiration date has been replaced with the updated expiration date; and
  cause, by the transmission, the distributed databases to be synchronized by updating the first database and the second database.

10. A payment processing computing device in accordance with claim 9, wherein the existing expiration date of the candidate payment card is after a stale date, wherein the stale date is a predetermined number of days before the existing expiration date.

11. A payment processing computing device in accordance with claim 9, further configured to transmit the updated expiration date to the first merchant computer.

12. A payment processing computing device in accordance with claim 11, further configured to transmit the payment card information to the first merchant computer.

13. A payment processing computing device in accordance with claim 9, wherein the candidate payment card is associated with a card-not-present recurring payment (CNP/RP) transaction.

14. A payment processing computing device in accordance with claim 13, further configured to notify an acquirer bank computing device associated with the first merchant that the existing expiration date has been replaced with the updated expiration date, and that the updated expiration date should be used for future transactions.

15. One or more non-transitory computer-readable storage media having computer-executable instructions embodied thereon for synchronizing distributed databases including a first database associated with a first merchant and a second database associated with an issuer party, the computer-executable instructions configured to be executed by at least one processor communicatively coupled to at least one memory device for storing payment card information and transaction information, the computer-executable instructions cause the processor to:
  select, by querying a database in the at least one memory device for payment cards having expiration dates within a predetermined time period from expiration, a candidate payment card having stale payment card information including an existing expiration date and an account identifier;
  perform a lookup in the at least one memory device using the account identifier;
  retrieve, based on the performed lookup, at least one payment transaction record from the at least one memory device corresponding to a recent card-present payment transaction performed by a cardholder at a second merchant using the candidate payment card;
  determine that the at least one retrieved payment transaction record includes updated expiration date data by comparing an expiration date associated with the at least one retrieved payment transaction record with the existing expiration date of the candidate payment card;
  generate an updated expiration date notification;
  automatically transmit the updated expiration date notification to a first merchant computer associated with the first merchant, the updated expiration date notification indicating that the existing expiration date has been replaced with the updated expiration date; and
  cause, by the transmission, the distributed databases to be synchronized by updating the first database and the second database.

16. The computer-readable storage media of claim 15, wherein the existing expiration date of the candidate payment card is after a stale date, wherein the stale date is a predetermined number of days before the existing expiration date.

17. The computer-readable storage media of claim 15, wherein the computer-executable instructions further cause the processor to transmit the updated expiration date to the first merchant computer.

18. The computer-readable storage media of claim 15, wherein the computer-executable instructions further cause the processor to transmit the payment card information to the first merchant computer.

19. The computer-readable storage media of claim 15, wherein the candidate payment card is associated with a card-not-present recurring payment (CNP/RP) transaction.

20. The computer-readable storage media of claim 19, wherein the computer-executable instructions further cause the processor to notify an acquirer associated with the first merchant that the existing expiration date has been replaced with the updated expiration date, and that the updated expiration date should be used for future transactions.

* * * * *